United States Patent [19]

Kwan

[11] Patent Number: 5,855,661
[45] Date of Patent: *Jan. 5, 1999

[54] PIGMENT DISPERSION

[75] Inventor: Wing Sum Vincent Kwan, Deerfield, Ill.

[73] Assignee: Videojet Systems International, Inc., Wood Dale, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 588,215

[22] Filed: Jan. 18, 1996

Related U.S. Application Data

[60] Provisional application No. 60/004,701, Oct. 3, 1996.

[51] Int. Cl.$^6$ .................................................. C09C 1/36
[52] U.S. Cl. .......................... 106/444; 106/445; 106/449; 106/471
[58] Field of Search .................................. 106/444, 445, 106/449, 471

[56] References Cited

U.S. PATENT DOCUMENTS

| | | | |
|---|---|---|---|
| 3,398,113 | 8/1968 | Godshalk et al. | 524/197 |
| 3,453,130 | 7/1969 | Feld | 106/447 |
| 4,160,760 | 7/1979 | Carr et al. | 523/333 |
| 4,277,288 | 7/1981 | Lawrence et al. | 106/413 |
| 4,545,821 | 10/1985 | Rau et al. | 106/418 |
| 4,913,063 | 4/1990 | Jonas et al. | 106/413 |
| 5,420,317 | 5/1995 | Laufenberg et al. | 554/163 |
| 5,501,732 | 3/1996 | Niedenzu et al. | 106/447 |

FOREIGN PATENT DOCUMENTS

| | | |
|---|---|---|
| 2 281 410 | 3/1976 | France . |
| 2673838 | 9/1992 | France . |
| 1 959 233 | 6/1970 | Germany . |
| 2 043 629 | 3/1972 | Germany . |
| 2 313 073 | 9/1974 | Germany . |
| 51-082317 | 7/1976 | Japan . |
| 59-170130 | 9/1984 | Japan . |
| 59-170131 | 9/1984 | Japan . |
| 60-079068 | 5/1985 | Japan . |
| 62-267368 | 11/1987 | Japan ..................................... 106/460 |
| 6115945 | 4/1994 | Japan . |
| 6145025 | 5/1994 | Japan . |
| 07053910 | 2/1995 | Japan . |
| 07165986 | 6/1995 | Japan . |
| 1104939 | 3/1968 | United Kingdom . |
| 1 287 576 | 8/1972 | United Kingdom . |
| 1 460 315 | 1/1977 | United Kingdom . |
| 1 494 746 | 12/1977 | United Kingdom . |

OTHER PUBLICATIONS

Hyperdispersants, Schofield, J.D., Surface Coatings Institute (JOCCA),74(6), pp. 204, 206–210, Jun. 1991.

A Model for Organic pigments in Oil or Water–Based Printing Inks, Hays, B.G., Am. Ink Maker, v. 64, pp. 13–21, Oct. 1996.

PCT Search Report, Dec. 10, 1996, (GB 96/02415).

Hawley's Condensed Chemical Dictionary, 11$^{th}$ ed. pp. 694 and 838, Van Nostrand, NY, 1987 (no month).

*Primary Examiner*—Mark L. Bell
*Assistant Examiner*—Scott L. Hertzog
*Attorney, Agent, or Firm*—Leydig, Voit & Mayer, Ltd.

[57] ABSTRACT

A method for preparing modified pigment particles including contacting an aqueous slurry of metallo, mono and bi-dentate ligand pigment particles with a surface derivatizing agent having one or more phenolic moieties, a 1, 3-diketo moiety or a combination thereof.

25 Claims, No Drawings

PIGMENT DISPERSION

This application claims priority from the U.S. Provisional Patent Application Serial No. 60/004,701, filed Oct. 3, 1995.

FIELD OF THE INVENTION

The present invention relates generally to the field of pigmented dispersions. More specifically, the present invention is directed towards a method of preparing chelated pigment particles for use in pigment dispersions utilizing a wide variety of solvents.

BACKGROUND OF THE INVENTION

Pigments of the formula $X_aY_b(Z(L1)_n(L2)_m)_c$, where X is an alkaline earth metal, Y is a transition metal or heavy metal, Z is a transition metal or heavy metal, L1 and L2 are ligands, which can be mono-dentate ligands, such as, for example, cyano or carbonyl moieties, or bi-dentate ligands, such as, for example, nitroso-beta-naphthol as in Pigment Green B, a equals 1 or 0, b is an integer from 1–6, c is an integer from 1–6 and n and m equal an integer from 0 to 6, are ionic in character, and thus highly polar. As a result, dispersing pigments of the above formula into non-polar solvent media is difficult, expensive, and time-consuming. One member of this pigment family is milori blue, or "iron blue," which is a class of blue pigments composed of either iron(III)hexacyanoferrate II or iron(II)hexacyanoferrate III. These pigments are in essence iron complexes composed of iron ions and cyano moieties. Several methods have been disclosed in the art for creating milori blue pigment dispersions, but none are entirely satisfactory.

For example, U.S. Pat. No. 4,277,288 discloses a method of dispersing milori blue pigment by milling and sieving the pigment particles, which is both expensive, and time consuming.

In addition to the aforementioned use of mechanical force, the use of anionic surfactants, in situ polymerization, and encapsulation have been proposed to prepare stable, homogenous dispersions of milori blue. Specifically, JP 51082317 discloses the use of alkylphosphonic acid, while JP 6145025 discloses the use of soy lecithin. In situ polymerization is proposed in U.S. Pat. No. 5,420,317, and encapsulation of the pigment particles by cationic polymers is disclosed in FR 2,673,838. In each of these cases, however, relatively expensive ingredients are required, and milling is still required to obtain a stable, homogenous dispersion.

U.S. Pat. Nos. 3,398,113 and 4,160,760, disclose the preparation of a dispersion of milori blue, using an emulsion-type, two phase system, in which, if organic media is used, water removal is difficult and expensive.

Finally, U.S. Pat. No. 4,545,821 discloses preparing a dispersion of milori blue by pre-depositing the milori blue pigment particles onto mica flakes. This process is simply not economical on an industrial scale.

Thus, a need exists for a fast and economical way to prepare a stable milori blue pigment dispersion. A need also exists for a method of preparing milori blue pigment particles, so those particles can be easily dispersed in a wide variety of solvents. These needs are met by the method of the present invention.

BRIEF SUMMARY OF THE INVENTION

In accordance with the present invention, a surface derivatizing agent is added to an aqueous slurry of a pigment of the formula $X_aY_b(Z(L1)_n(L2)_m)_c$, where X is an alkaline earth metal, Y is a transition metal or a heavy metal, Z is a transition metal or a heavy metal, L1 and L2 are ligands, which can be mono-dentate ligands, such as, for example, cyano or carbonyl moieties, or bi-dentate ligands, such as, for example, nitroso-beta-naphthol as in Pigment Green B, a equals 1 or 0, b and c are integers from 1–6 and n and m are integers from 0–6, and mixed for a time sufficient for the pigment particles to contact the derivatizing agent. The pigment particles thus modified by the surface derivatizing agent can then be recovered by conventional means, such as by filtration, and dried to obtain dry modified pigment particles. The modified pigment particles can then be dispersed in a wide range of solvents, as by first adding an organic vehicle to the dry modified pigment particles to make pigment concentrate, and then dispersing the pigment concentrate in the solvent or solvents of choice. The modified pigment particles disperse easily in a wide variety of organic solvents, and provide stable, clear dispersions having a small mean pigment particle size and narrow particle size distribution.

DESCRIPTION OF THE PREFERRED EMBODIMENTS

As indicated, the present invention, in one aspect, provides a method for preparing pigment particles of the formula $X_aY_b(Z(L1)_n(L2)_m)_c$, where X is an alkaline earth metal, Y is a transition metal or a heavy metal, Z is a transition metal or a heavy metal, L1 and L2 are ligands, which can be mono-dentate ligands, such as, for example, cyano or carbonyl moieties, or bi-dentate ligands, such as, for example, nitroso-beta-naphthol as in Pigment Green B, a equals 1 or 0, b and c are integers from 1–6, and n and m are integers from 0–6, for use in a pigment dispersion. This method comprises preparing an aqueous slurry of pigment particles, optionally adjusting the pH of the slurry, optionally heating the slurry, adding a surface derivatizing agent, stirring the solution, optionally cooling the heated solution, and recovering the pigment particles modified by the surface derivatizing agent. Recovery may be by means of filtration or other suitable means. The recovered, modified pigment particles may then be washed and dried.

The modified pigment can then be mixed with an organic vehicle to obtain a pigment concentrate, which can then be dispersed in various solvent systems, to create a pigment dispersion. These pigment dispersions find uses in inks, including but not limited to oil-based, solvent based or solid material-based inks; coatings including but not limited to paints; colorants including but not limited to color toners, and all other applications which demand a dispersion of such pigment particles in a medium such as the use of such dispersion in flat-screen display devices.

The aqueous slurry should contain pigment particles in an amount up to about 20% by weight of the slurry. Preferably, the slurry should contain from about 8% to about 12% by weight of pigment particles. The pigment used should have a specific gravity from about 1.5 to about 3.5; otherwise phase separation may occur upon addition and mixing of the derivatizing agent. In fact, it is believed it may be possible that any metal containing pigment having a specific gravity from about 1.5 to about 3.5 can be used.

The preferred pigment for use in the practice of the present invention is milori blue pigment. Milori blue pigment can be obtained from the Degussa Company (Ridgefield, N.J.) under the trademark MANOX BLUE, and the Pyosa Company (Mexico).

Once the slurry is obtained, the pH of the slurry may be adjusted. It is usually preferred to adjust the pH to a range of from about 6.0–6.6. The exact pH to provide optimal results may vary from pigment to pigment. Preferred pH adjusting compounds include weakly basic compounds, such as sodium bicarbonate and ammonium bicarbonate.

After the pH of the slurry is optionally adjusted, the surface derivatizing agent should be added, and the resulting solution should be stirred for a time sufficient to contact the derivatizing agent with the pigment particles. Such contact occurs more quickly under the influence of heat. Therefore, it is preferred that the slurry be heated, prior to, during, or after the addition of the derivatizing agent, and that the mixture of pigment and derivatizing agent be stirred under the influence of heat. Although the temperature in this step is not critical, it should be below the temperature at which degradation of the pigment occurs. Such degradation has been observed, with respect to milori blue pigment, at temperatures over about 70° C.

Further, as stated above, as the temperature of the surface derivatizing agent/pigment solution increases, the amount of mixing time needed to contact the derivatizing agent with the pigment decreases. Thus, to minimize the amount of mixing time required, the preferred temperature range usually is from about 55° C. to about 65° C. When this temperature range is used, the time necessary to contact the derivatizing agent with the pigment particles is from about 5 minutes to about 20 minutes. The temperature and time required in any particular situation will vary depending upon the particular pigment and derivatizing agent that is used.

The surface derivatizing agent may be chosen from a wide range of compounds having one or more phenolic moieties, and/or 1,3 diketo moieties, including alkylated phenol compounds, ortho substituted phenol compounds, 1,3-diketo alkyl derivative compounds, o-phenol alkyl(1-) ketone derivative compounds.

Alkylated phenol compounds comprise a family of compounds in which an alkyl "tail" is added to phenol. Nonylphenols, such as (4'nonyl)phenol, are preferred among the alkylated phenol compounds. For example, (4'nonyl) phenol has the following structure:

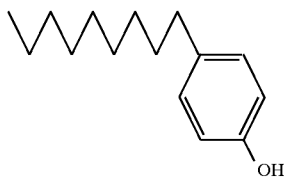

This compound has a nine-carbon alkyl tail. Other isomers of nonylphenol, including those having a branched tail, and including other positional isomers, may be used, as may mixtures of alkylated phenol compounds or isomers. Additional alkylated phenol compounds suitable for use with the methods of the present invention include, for example, compounds with shorter tails, such as pentylphenol and hexylphenol, and those with longer tails, such as decylphenol, undecylphenol, and so forth. In general, longer tails are preferred; however, nonylphenol is the preferred compound of the alkylated phenol compounds, inasmuch as it is inexpensive and widely commercially available. A particularly preferred nonylphenol mixture is that available under the designation Product No. 29085-8 from Aldrich Chemical Co. Inc., Milwaukee, Wis. This product comprises a mixture of isomers of nonylphenol.

While not wishing to limit the invention to a particular theory or mode of operation, it is believed that the phenolic oxygen has a high affinity for the pigment particle, and forms a coordinated complex with the particle. The long alkyl tail creates a hydrophobic micelle around the particle, and thus effectively renders the particle hydrophobic. It is also possible that the derivatizing agent is physically absorbed onto the pigment surface.

The terms "alkyl" or "alkylated" as used in this application are intended to encompass other moieties in addition to as pure alkyl chains, and include alkenyl and alkynyl chains as well as aliphatic chains, generally, that contain functional groups. It is only necessary for the aliphatic chain to render the pigment particle hydrophobic. The alkyl moiety, or an alkenyl or alkynyl analog, will typically have from about 6 to 24 carbon atoms, and more typically from about 8 to 18 carbon atoms.

Alternatively, or in addition thereto, the surface derivatizing agent may comprise a 1,3-diketo alkyl derivative. These compounds may be defined as alkyl analogs of acetylacetic acid, which has the following formula:

$CH_3COCH_2COOH$

Useful derivatives of this compound may include alkyl acids, aldehydes, ketones, and esters. A particularly preferred 1,3-diketo alkyl compound is ethylacetoacetate, such as that available from Aldrich Chemical Co., Inc., Milwaukee, Wis. While not wishing to limit the present invention to a particular theory or mode of operation, it is believed that the two carbonyl groups present in those compounds allow these compounds to form a chelate with pigment particles.

Another class of compound useful in the present invention are o-phenol alkyl(1-)ketone derivatives. As discussed above, the term "alkyl" includes other moieties in addition to pure alkyl chains. The preferred compound in this class is 2'-hydroxyacetophenone (HAP), which has the following formula:

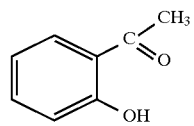

Other derivatives may include acids, acid salts, aldehydes, ketones, and esters. For example, ethyl salicylate, such as that available from Aldrich Chemical Co., Inc., Milwaukee, Wis., also is a surface derivatizing agent useful in the methods of the present invention. It is believed that the hydroxy and carbonyl oxygen atoms form a chelate with the pigment particle, thus rendering the particle hydrophobic.

Other phenolic compounds suitable for use as surface derivatizing agents include compounds of the following general formula.

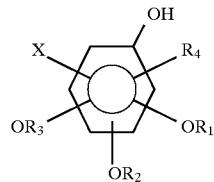

wherein $R_1$, $R_2$, and $R_3$ are the same or different and represent a straight-chain or branched-chain, alkyl, alkenyl, or alkynyl moiety of from 1–50 carbon atoms;

X is halogen; and $R_4$, is phenyl, alkenyl, alkyl, or alkynyl.

Any one or all of the foregoing substituents $OR_1$, $OR_2$, $OR_3$, X, and $R_4$ may be omitted, so long as at least one of these substituents is present on the phenol ring. For example, o-methoxyphenol may be used as a surface derivatizing agent, as may p-chlorophenol. The phenyl ring and any of $R_1$–$R_4$ may include substituents that do not interfere with the function of the surface derivatizing agent, such as hydroxy, carbonyl, alkyl, alkenyl, alkynyl, alkoxy, or any other substituent that allows the compound to function as a surface derivatizing agent.

The surface derivatizing agent also may include a naphthalene derivative, such as a compound of the following formula:

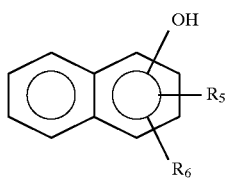

wherein —OH represents 1- or 2-hydroxy naphthalene and wherein $R_5$ and $R_6$ are nothing or are substituents that do not interfere with the function of the naphthalene derivative as a surface derivatizing agent. Preferably, $R_5$ and $R_6$ are straight-chain or branched-chain alkyl, alkenyl, or alkynyl of from 1–50 carbon atoms, or $R_5$ is an acetyl group and $R_6$ is nothing. When $R_5$ is an acetyl group, the naphthalene derivative compound preferably is 2-acetyl-1-naphthol or 3-acetyl-2-naphthol.

Other compounds suitable as surface derivatizing agents include ring-added hydroxyquinone derivatives, such as 2-hydroxy-1,4-naphthoquinone, 2-hydroxy-1,4-anthracenequinone, and so forth. The unsaturated rings may be substituted with any functional group or groups that do not interfere with the function of the hydroxyquinone derivative as a surface derivatizing agent.

Other compounds suitable for use as surface derivatizing agents include the following compounds and derivatives thereof:

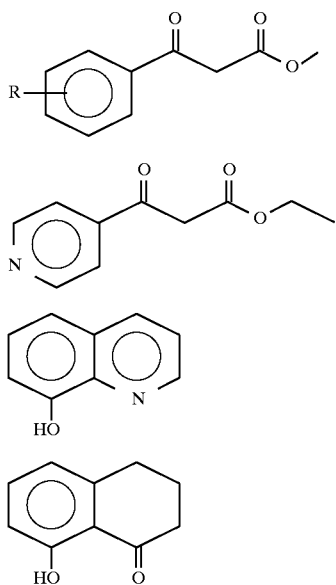

-continued

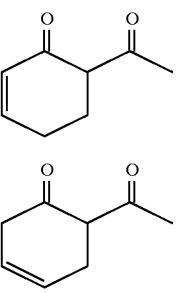

Again, the foregoing compounds may be substituted with any functional group or groups that do not interfere with the function of the surface compound as a derivatizing agent, such as halo, alkylhalo (such as $CF_3$), et al. The compounds may be saturated or unsaturated, or partially saturated, and may be substituted in ortho, para, or meta positions.

The foregoing represent only a few of the surface derivatizing agents that may be used in conjunction with the present invention. It should be understood, however, that the invention is not limited thereto. Indeed, any surface derivatizing agent may be used, so long as it forms a chelate with the pigment particles.

The surface derivatizing agent should be added in an amount from about 1% to about 10% by weight of the pigment particles in the aqueous slurry, and preferably, in an amount from about 1% to about 5% by weight. It is only necessary that the surface derivatizing agent be added in an amount effective to render the pigment particles hydrophobic. For economic reasons, smaller amounts of surface derivatizing agent are preferred. Accordingly, an especially preferred range of derivatizing agent is from about 1% to about 5% by weight of pigment particles.

After the surface derivatizing agent has been added, and the solution stirred sufficiently to contact the derivatizing agent with the pigment particles, the solution, if it has been heated, may be cooled if desired, and filtered by conventional means, to obtain wet modified pigment particles. These wet modified particles should then be washed with water, preferably deionized water, and dried by conventional means, to obtain dry modified pigment particles. These particles then can be dispersed into a solvent system to create a pigment dispersion. Such dispersions may be prepared as described below. Of course, other means for recovering the pigment may be employed, such as filtration. Further, wet pigment may be otherwise treated to remove water, as by contact with organic solvents that are miscible with water, or the like.

Typically, the dry modified pigment first is mixed with an organic vehicle compatible with the solvent system in which the pigment will be dispersed, such as varnish, to form a pigment concentrate. Suitable vehicles include LV-1830, available from the Lawter Company (Northbrook, Ill.), MVFG-380, available from the Walsh Company (Newark, N.J.), and Shellac R-49, available from the Mantrose-Bradshaw-Zinsser Group (Westport, Conn.). The organic vehicle should be added in an amount sufficient to obtain a ratio of modified pigment to vehicle of about 1:0.8 by weight or less.

The pigment concentrate can then be dispersed in various solvent systems. Although sonication of the dispersion is not necessary, it is preferred to aid dispersion of the pigment into the solvent. Useful solvent systems include aqueous systems, aromatic solvents, such as toluene and xylene, aliphatic solvents, such as hexane, halogenated hydrocarbons, such as methylene chloride and chloroform, aromatic oils, such as Tuffo 2000, an aromatic oil, available from EMCO Chemical Distributor (Chicago, Ill.), aliphatic oils, such as Magie 47 and Magie 52, both available from the Walsh Company, drying and non-drying vegetable oil, glycol ethers, such as propylene glycol n-prophyl ether (PnP) and depropylene glycol n-propyl ether (DpnP), esters, such as ethyl acetate, and ketones, such as methylethylketone and acetone, as well as in solvent systems comprising two or more of the above solvents. The preferred solvents are toluene, and if a polar solvent is desired, ethanol or an ether is preferred.

If it is desired to disperse the pigment concentrate into a polar solvent, such as isopropanol, or ethanol, toluene should be used as a co-solvent in an amount up to about 5% by volume of the dispersion. However, it has been discovered that the use of toluene as a co-solvent can be avoided if dry modified pigment particles are mixed with a Shellac R-49, previously dissolved in ethanol to give a 40% solution of R-49 by weight, to form the pigment concentrate. For this reason, if the pigment concentrate is to be dispersed in a polar solvent, it is preferred that the pigment concentrate be prepared using shellac R-49.

It has also been discovered that the dry modified pigment particles of the present invention can be used in an aqueous dispersion, if the pigment concentrate is prepared using polyvinylpyrrolidone as a vehicle. Polyvinylpyrrolidone is available under the tradename K-15, from ISP Technology, Inc. (Wayne, N.J.).

It has been found that the pigment concentration in the pigment dispersion has an effect on both mean pigment particle size, as well as on particle size distribution. This effect is shown in the following table, where an ink concentrate made using milori blue pigment modified with 5% by weight of nonylphenol, and LV-1830 as the vehicle, was dispersed in toluene at varying concentrations. The particle size and particle size distribution for each dispersion was then measured, using a Hariba light scattering particle size analyzer, model LA-900 from Hariba Company. The results are shown in Table 1.

TABLE 1

Effect of pigment concentration on mean particle size and particle size deviation of milori blue dispersion in toluene.

| Pigment Conc. (wt %) | Mean Part. Size (micron) | Percen. of Part. < 0.5 micron | Size Deviat. (micron) |
| --- | --- | --- | --- |
| 5.0 | 4.69 | 0.0 | 1.85 |
| 2.4 | 0.31 | 69.3 | 1.27 |
| 1.7 | 0.17 | 93.9 | 0.42 |
| 0.9 | 0.14 | 98.2 | 0.11 |

The results show that as the concentration of pigment decreased, so did the mean pigment particle size, as well as the particle size distribution. Thus, as the pigment concentration in this system decreased to 2% by weight of the dispersion or less, more than 90% of the particles had a particle size of 0.17 microns or less.

Obtaining a dispersion having a small mean particle size, such as a mean particle size less than 0.3 microns, as well as a narrow particle size distribution, results in a dispersion that is clear and transparent. This is desirable because transparent pigment dispersions are useful in ink jet applications where color printing is desired.

EXAMPLE 1

A 10% slurry of milori blue pigment was prepared using 65 grams of milori blue presscake and 138 grams of water. The pH of the slurry was then adjusted to 6.6 using 4 grams of sodium bicarbonate. The slurry was then heated to 65° C., and 5% by weight of the pigment of nonylphenol was added. The resulting solution was then stirred at a temperature of 65° C. for 10 minutes, at which point it was removed from heat and allowed to cool to room temperature without the aid of any external cooling source. The solution was then filtered on a Buchner funnel using a Whatman #1 filter paper, to obtain the wet modified pigment particles. The wet modified pigment particles were then washed with deionized water, and allowed to air-dry, to obtain 20 grams of dry modified pigment particles.

0.5 grams of the dry modified pigment was then mixed with 0.5 grams of LV-1830 to obtain an pigment concentrate.

EXAMPLE 2

0.5 grams of the dry modified pigment particles of Example 1, was mixed with 2.0 ml of a solution of Shellac R-49 (40% by weight) in ethanol to prepare a pigment concentrate. The ratio of pigment to shellac R-49 was 1:1.6. The pigment concentrate was then easily dispersed in ethanol to form a dispersion having a pigment concentration of 10%, using sonication. Pigment particle size, and the particle size distribution in the dispersion was then measured using a Hariba light scattering particle size analyzer, Model LA-900, from Hariba Company. The median particle size was 0.18 microns, and greater than 93% of the pigment particles in the dispersion had a particle size of less than 0.25 microns.

EXAMPLE 3

0.15 grams of dry modified pigment particles from Example 1 were mixed with 0.15 grams of K-15 polyvinylpyrrolidone to form a pigment concentrate. The pigment concentrate was then easily dispersed into deionized water to obtain an aqueous dispersion containing 5% by weight of pigment.

COMPARATIVE EXAMPLE 1

0.25 grams of unmodified milori blue pigment was mixed with 0.25 grams of LV-1830 to form a pigment concentrate. The pigment concentrate was then dispersed in toluene by sonication to obtain a pigment dispersion containing 5% milori blue pigment by weight of the dispersion. After one day, partial separation occurred, and some pigment particles settled onto the bottom. Thus, the unmodified pigment dispersion was not as stable as its modified counterpart.

The present invention thus provides a method of dispersing pigment of the formula $x_a Y_b (Z(L1)_n (L2)_m)_c$ where x is $X_a Y_b (Z(L1)_n (L2)_m)_c$, where X is an alkaline earth metal, Y is a transition metal or heavy metal, Z is a transition metal or heavy metal, L1 and L2 are ligands, which can be mono-dentate ligands, such as, for example, cyano or carbonyl moieties, or bi-dentate ligands, such as, for example, nitroso-beta-naphthol as in Pigment Green B, a equals 1 or 0, b is an integer from 1–6, c is an integer from 1–6 and n and m equal an integer from 0 to 6, in organic media that is economical, fast, and convenient, and results in a clear, stable pigment dispersion that can be adjusted easily by the formulator to obtain a dispersion having a small average particle size and a narrow particle size distribution, if desired.

What is claimed is:

1. A method for preparing modified pigment particles, comprising contacting an aqueous slurry of pigment particles of the formula $X_a Y_b (Z(L1)_n (L2)_m)_c$, where X is an alkaline earth metal, Y is a transition metal or a heavy metal, Z is a transition metal or a heavy metal, L1 and L2 are ligands selected from the group consisting of mono-dentate ligands and bi-dentate ligands, a is 1 or 0, b and c are integers from 1–6, and n and m are integers from 0–6, with a surface derivatizing agent having a 1,3 diketo moiety and a phenolic moiety or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof.

2. The method of claim 1, wherein the surface derivatizing agent is a phenol substituted with an unsubstituted alkyl group or an alkylcarbonyl group.

3. The method of claim 2, where the surface derivatizing agent is added in an amount less than about 10% by weight of the pigment particles.

4. A method of preparing modified pigment particles, comprising;
(a) preparing an aqueous slurry of pigment particles of the formula $X_aY_b(Z(L1)_n(L2)_m)_c$, where X is an alkaline earth metal, Y is a transition metal or a heavy metal, Z is a transition metal or a heavy metal, L1 and L2 are ligands selected from the group consisting of mono-dentate ligands and bi-dentate ligands, a is 1 or 0, b and c are integers from 1–6, and n and m are integers from 0–6, such that the pigment particles are present in an amount from about 1% to about 20% by weight of the slurry;
(b) adjusting the pH of the slurry;
(c) adding a surface derivatizing agent having a 1,3 diketo moiety and a phenolic moiety or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof, to the slurry in an amount less than about 10% by weight of the pigment particles;
(d) mixing the surface derivatizing agent into the slurry to obtain modified pigment particles; and
(e) recovering and drying the modified pigment particles.

5. The method of claim 4, where the aqueous slurry of pigment particles contains from about 8% to about 12% pigment particles by weight of the slurry.

6. The method of claim 5, where the surface derivatizing agent is nonylphenol.

7. The method of claim 5, where the surface derivatizing agent is added to the slurry in an amount less than about 5% by weight of the pigment particles.

8. The method of claim 7, where the surface derivatizing agent is mixed into the slurry at a temperature from about 55° C. to about 65° C.

9. A method for preparing a pigment concentrate, comprising adding an organic vehicle to modified pigment particles prepared in accordance with claim 1.

10. The method of claim 9, where the organic vehicle is added in an amount sufficient to achieve a ratio of pigment particles to vehicle of about 1:0.8 or less by weight.

11. A method for preparing a pigment dispersion, comprising dispersing a concentrate prepared according to the method of claim 9 with one or more solvents selected from the group consisting of water, alcohol, aromatic solvents, aliphatic solvents, halogenated hydrocarbons, aromatic oils, aliphatic oils, glycol ethers, esters, and ketones.

12. The method of claim 11, where the concentrate is present in an amount sufficient to achieve a mean pigment particle size in the dispersion of less than or equal to 0.3 microns.

13. A pigment dispersion, comprising
(a) a pigment of the formula $X_aY_b(Z(L1)_n(L2)_m)_c$, where X is an alkaline earth metal, Y is a transition metal or heavy metal, Z is a transition metal or heavy metal, L1 and L2 are ligands selected from the group consisting of mono-dentate ligands and bi-dentate ligands, a equals 1 or 0, b is an integer from 1–6, c is an integer from 1–6 and n and m equal an integer from 0 to 6;
(b) a surface derivatizing agent having a 1,3 diketo moiety and a phenolic moiety, or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof;
(c) an organic vehicle; and
(d) one or more solvents, selected from the group consisting of water, alcohol, aromatic solvents, aliphatic solvents, halogenated hydrocarbons, aromatic oils, aliphatic oils, glycol ethers, esters, and ketones.

14. A method for preparing modified pigment particles, comprising contacting an aqueous slurry of milori blue pigment particles with a surface derivatizing agent having a 1,3 diketo moiety and a phenolic moiety, or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof.

15. The method of claim 14 wherein the surface derivatizing agent is a phenol substituted with an unsubstituted alkyl group or an alkylcarbonyl group.

16. The method of claim 15, where the surface derivatizing agent is added in an amount less than about 10% by weight of the pigment particles.

17. A method of preparing modified pigment particles, comprising:
(a) preparing an aqueous slurry of milori blue pigment particles, such that the pigment particles are present in an amount from about 1% to about 20% by weight of the slurry;
(b) adjusting the pH of the slurry to a pH of about 6.0 to about 6.6;
(c) adding a surface derivatizing agent having a 1,3 diketo moiety and a phenolic moiety or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof, to the slurry in an amount from about 1% to about 10% by weight of the pigment particles;
(d) mixing the surface derivatizing agent into the slurry to obtain modified pigment particles; and
(e) separating and drying the modified pigment particles.

18. The method of claim 17, where the aqueous slurry of pigment particles contains from about 8% to about 12% pigment particles by weight of the slurry.

19. The method of claim 18, where the surface derivatizing agent is nonylphenol.

20. The method of claim 18, where the surface derivatizing agent is added to the slurry in an amount less than 5% by weight of the pigment particles.

21. The method of claim 20, where the surface derivatizing agent is mixed into the slurry at a temperature from about 55° C. to about 65° C.

22. A method for preparing a pigment concentrate, comprising adding an organic vehicle to modified pigment particles prepared in accordance with claim 14.

23. The method of claim 22, where the vehicle is added in an amount sufficient to achieve a ratio of pigment particles to vehicle of about 1:0.8 by weight or less.

24. A method for preparing a pigment dispersion, comprising dispersing a concentrate prepared according to the method of claim 22 with one or more solvents selected from the group consisting of water, alcohol, aromatic solvents, aliphatic solvents, halogenated hydrocarbons, aromatic oils, aliphatic oils, glycol ethers, esters, and ketones.

25. The method of claim 24, where the concentrate is present in an amount sufficient to achieve a mean pigment particle size in the dispersion of less than or equal to 0.3 microns.

* * * * *